United States Patent [19]

Gutekunst et al.

[11] Patent Number: 4,593,623
[45] Date of Patent: Jun. 10, 1986

[54] REVERSIBLE, ACCUMULATING LONGITUDINAL DRIVE TUBE CARRIER

[75] Inventors: Stanley K. Gutekunst, Nazareth; Russell H. Scheel, Easton; Barry L. Ziegenfus, Saylorsburg, all of Pa.

[73] Assignee: Heico Inc., Mendota, Ill.

[21] Appl. No.: 598,847

[22] Filed: Apr. 10, 1984

[51] Int. Cl.[4] .............................................. B61B 13/12
[52] U.S. Cl. ...................................... 104/166; 104/165
[58] Field of Search ................................ 104/165, 166

[56] References Cited

U.S. PATENT DOCUMENTS

| | | | |
|---|---|---|---|
| 3,356,040 | 12/1967 | Fonden | 104/130 |
| 3,621,790 | 11/1971 | Broome | 104/166 X |
| 3,818,837 | 6/1974 | Jacoby et al. | 104/166 |
| 3,842,752 | 10/1974 | Harwick | 104/166 |
| 4,036,148 | 7/1977 | Jones et al. | 104/166 |
| 4,086,854 | 5/1978 | Scheel | 104/166 |
| 4,347,792 | 9/1982 | Nagahori | 104/166 |
| 4,353,306 | 10/1982 | Rohrbach et al. | 104/166 |

FOREIGN PATENT DOCUMENTS 2919770 11/1980 Fed. Rep. of Germany ...... 104/166

Primary Examiner—Randolph A. Reese
Assistant Examiner—David F. Hubbuch
Attorney, Agent, or Firm—Wood, Dalton, Phillips, Mason & Rowe

[57] ABSTRACT

A carrier system having a carrier movable along a path as defined by a trackway and driven from a rotatable drive tube by means of one or more drive wheels which can be adjustably angularly related relative to the drive tube for determining the direction and speed of carrier travel. The carrier has a multi-function accumulation rod operable in both accumulation of carriers as well as at a stop station along the path of travel. The accumulation rod is movable to control the angular position of the drive wheel to achieve stopping of the carrier at the stop station as well as to cause accumulation of one carrier behind another. The accumulation rod is operable in either direction of travel of the carrier to affect accumulation. Reverser structure operable at the end of the path of travel of the carrier causes a shift in the orientation of the drive wheel and the accumulation rod whereby the carrier will travel in an opposite direction and with the accumulation rod functioning in an accumulation mode in the reverse direction of travel.

20 Claims, 13 Drawing Figures

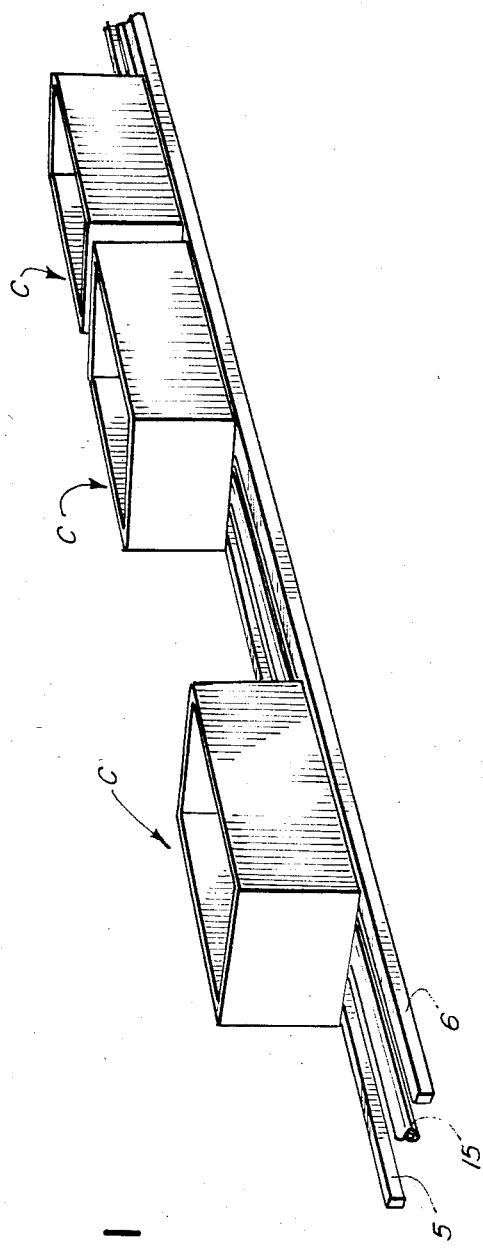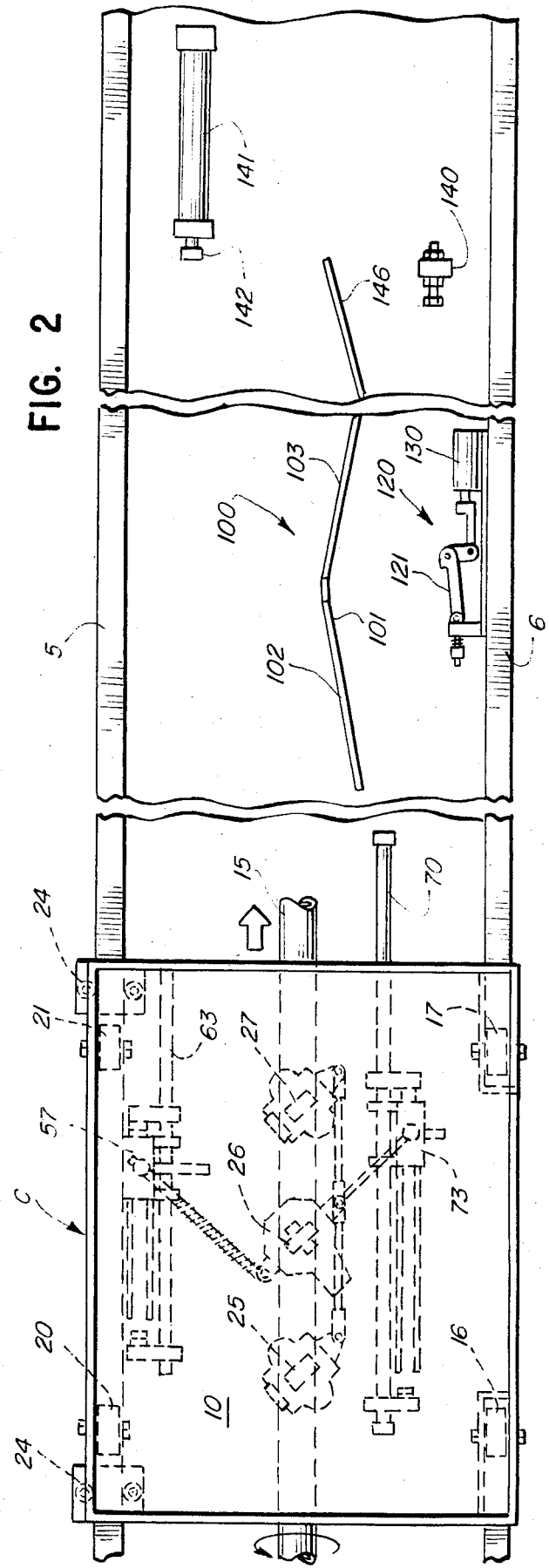

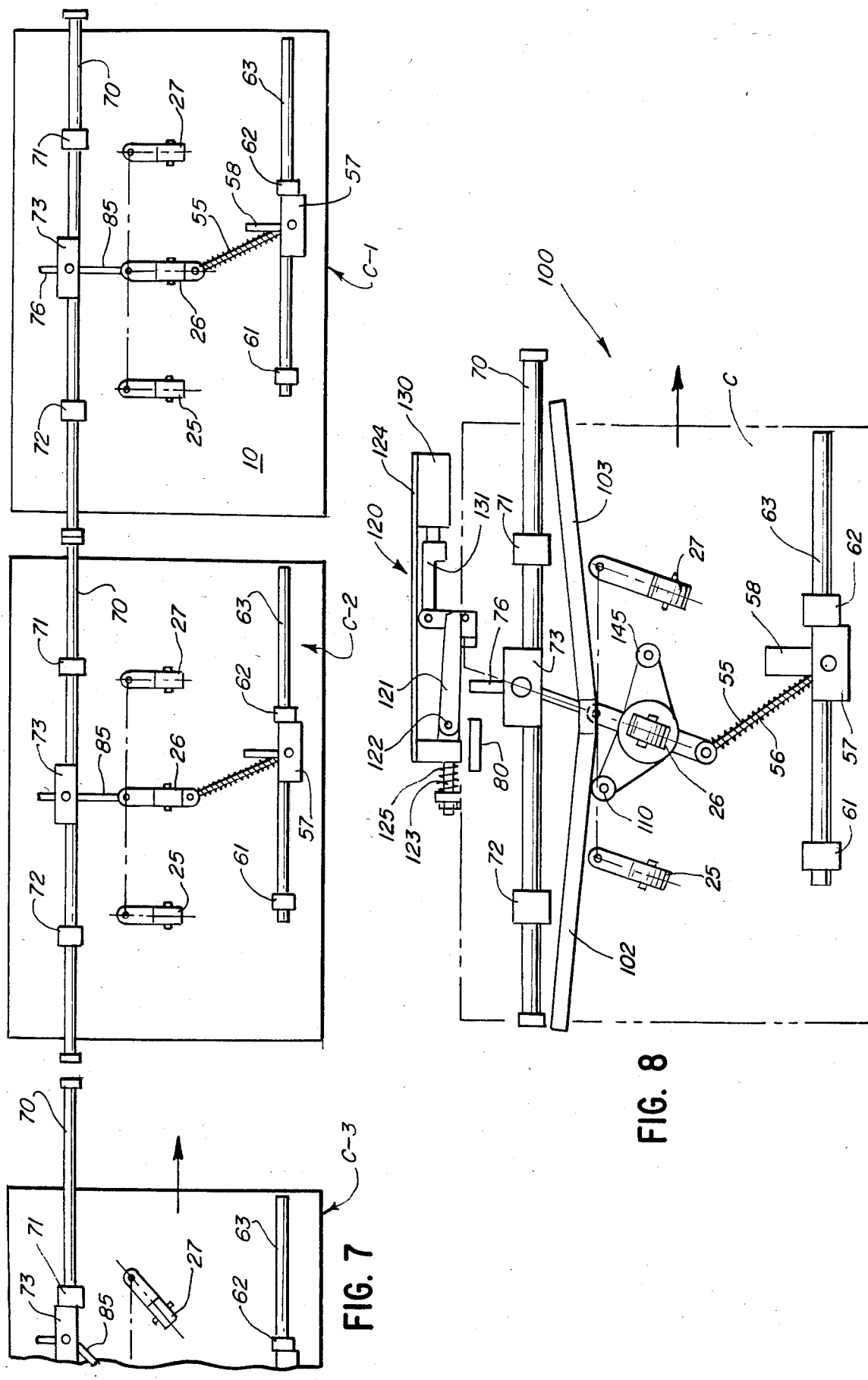

4,593,623

REVERSIBLE, ACCUMULATING LONGITUDINAL DRIVE TUBE CARRIER

BACKGROUND OF THE INVENTION

This invention relates to a carrier system having one or more carriers movable along a path and which have one or more drive wheels engageable with a rotatable drive tube to impart speed and travel direction to the carrier.

Carrier systems having a carrier movable along a track and propelled by power derived from a rotatable drive tube extending along the track and which is engaged by one or more angularly adjustable drive wheels mounted on the carrier have been in existence for many years. The drive wheels have an angular adjusting movement between a position generally normal to the axis of rotation of the drive tube whereby rotation of the drive tube rotates the drive wheel without any linear motion imparted to the carrier and a limit position in which the drive wheel is related to the drive tube at a maximum angle and the drive tube imparts a component of force to the carrier through the drive wheel to propel the carrier along the guide track.

The carrier systems of this type have many different uses including transport of materials and various manufacturing operations. The carrier system may have a carrier movable back and forth along a track or have plural carriers movable unidirectionally along the track.

One control for the carriers in such carrier system can be the stopping of a carrier at a stop station. The stopping of the carrier at the stop station is achieved by means which cause the drive wheel to move from an angled position to a position approximately normal to the rotation axis of the drive tube. Subsequently, the drive wheel returns to an angled position for movement of the carrier from the stop station. Another control can be accumulation of carriers whereby, as one carrier approaches a preceding stationary carrier the approaching carrier will be caused to slow down and stop at a position immediately adjacent and to the rear of the preceding stationary carrier.

SUMMARY OF THE INVENTION

A feature of the invention disclosed herein is to provide a carrier system having a new and improved structure to achieve stopping and restarting of a carrier at a stop station.

A further feature of the invention is to provide a carrier having new and improved structure providing two-way accumulation of a carrier operable in opposite directions of carrier travel. Additionally, the carrier system has means for stopping the carrier at the end of the carrier travel path and causing travel of the carrier in the opposite direction A further feature of the structure is the use of the accumulation rod and its unique structural association with carrier drive means including one or more drive wheels on the carrier which coact with a rotatable drive tube for causing movement of the carrier along the path.

In carrying out the foregoing, the carrier system has a movable carrier with an elongate accumulation rod movably mounted on the carrier and extending lengthwise thereof and which has a normal position with an end extending beyond the carrier in the direction of carrier travel. At the end of the travel path of the carrier in one direction, means are operable to shift the accumulation rod and have an end thereof extend beyond the leading end of the carrier as the carrier travels in the opposite direction. With this construction, the accumulation rod can sense the approach of the carrier, in either direction of travel, to a preceding carrier which is stopped and cause a slow down and stopping of the carrier adjacent to the previously stopped carrier by a change in the angle of the drive wheels. The means which shifts the accumulation rod at the end of the path of travel is operable to shift the drive wheels to a position for movement of the carrier along the path in a reverse direction.

The carrier structure provides a new and improved operation at a stop station where the carrier is to be stopped. At the stop station, an acceleration-deceleration cam engages a cam follower associated with the carrier drive wheels and gradually moves the drive wheels from an angled position relative to the rotatable drive tube to a position approaching a central position wherein the drive wheels extend transverse to the rotatable drive tube and the carrier moves at a minimal speed. Immediately prior to stopping, the accumulation rod is shifted lengthwise of the carrier by engagement of a deceleration block thereon with a carrier stop at the stop station and, as a fixed stop on the carrier comes into engagement with the carrier stop, the accumulation rod has moved to a position wherein the drive wheels are brought to the central position and the cam follower has moved away from the cam. Subsequently, the accumulation rod is freed for movement and a spring acts to immediately move the cam follower from the position spaced from the acceleration-deceleration cam onto the acceleration cam for rapid movement of the drive wheels to an angled position and rapid return of the carrier to normal travel speed.

The prior carrier systems have not had the new and improved action at the stop station wherein the accumulation rod moves a cam follower entirely off an acceleration-deceleration cam and with spring loading operable to bring the cam follower back into engagement with the cam through an arc of movement which moves the associated drive wheel to a sufficiently angled position for rapid start of the carrier. Further, the prior carrier systems have not had an accumulatior rod with a two-way carrier which can provide for accumulation in both directions of travel of the carrier and which functions at an end stop location at the end of the path to assist in reversal of the drive wheel structure to cause the carrier to travel in an opposite direction.

BRIEF DESCRIPTION OF THE DRAWINGS

FIG. 1 is a perspective view of a series of carriers formed as containers shown in association with guide tracks and a rotatable drive tube;

FIG. 2 is a fragmentary plan view of the carrier system;

FIG. 7 is a diagrammatic view of components of the carrier system showing the accumulation action with respect to a number of carriers and as viewed from the underside thereof;

FIG. 8 is a schematic view of the carrier approaching a stop station as viewed from the underside of the carrier;

DESCRIPTION OF THE PREFERRED EMBODIMENTS

Figure 3:
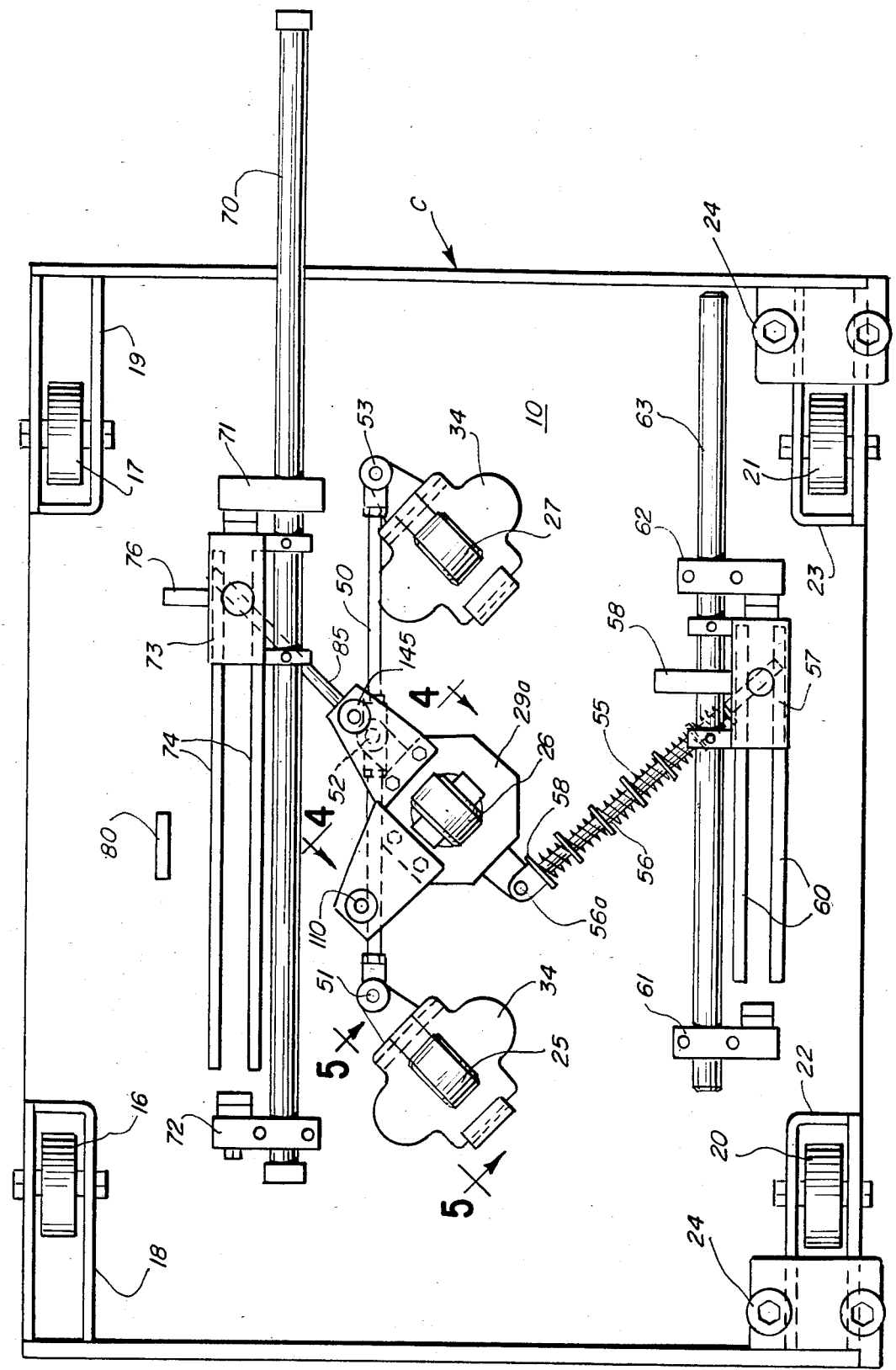
FIG. 3 is a bottom plan view of a carrier as used in the carrier system.

The carrier system utilizes one or more carriers, indicated generally at C, which, as shown in FIG. 1, are in the form of containers. Frequently, the carriers will be in the form of a pallet on which materials, products, or containers can be placed and the particular form of the carrier as a pallet or container is optional, dependent upon the utilization of the carrier system. The carriers C move along a path of travel which, as shown in FIGS. 1 and 2, is defined by a pair of spaced-apart tracks 5 and 6 and with a driven, rotatable drive member in the form of a drive tube 15 extending lengthwise of the tracks providing a power source for movement of the carriers along the path. The construction of a carrier C is shown in FIGS. 2 and 3, with FIG. 2 being a plan view of the carrier C and FIG. 3 being a view looking toward the underside thereof.

The carrier has a base 10 in the form of a plate, with frame members at each of the corners supporting a rotatable wheel which is supported on and rolls along the tracks. One side of the carrier has rollers 16 and 17 supported by frame members 18 and 19 for movement along the track 6. The rollers 20 and 21 are supported by frame members 22 and 23 for rolling engagement with the track 5. Spaced pairs of rollers 24 are positioned on the carrier base to engage the sides of the track 5.

The carrier C is propelled along the tracks 5 and 6 by drive means associated with the rotatable drive member 15. This drive means includes one or more drive wheels, with the carrier C shown in FIGS. 2 and 3 having three drive wheels 25, 26, 27. The number of drive wheels to be used is dependent upon the drive requirements for the carrier.

As well known in the art, the speed and direction of travel of a carrier C along the tracks is dependent upon the attack angle of the drive wheels to the drive member 15. The drive wheels 25-27 are rotatably mounted on the underside and extend downwardly from the carrier base 10.

Figure 4:
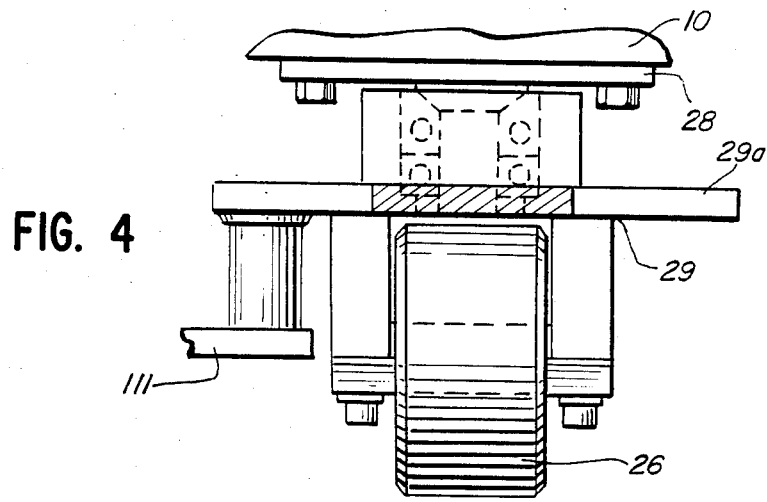
FIG. 4 is an end elevational view of one type of roller assembly as used for support of the carrier on a guide track and taken along the line 4—4 in FIG. 3.

The drive wheel 26 is shown particularly in FIG. 4 and has a mounting plate 28 which rotatably supports the structure 29 including a plate 29a carrying the drive wheel. Spring means, not shown, urge the drive wheel away from the carrier base 10. A preferred form of drive wheel mounting is shown in FIGS. 5 and 6 and such mounting can be used for the drive wheel 26.

Figure 5:
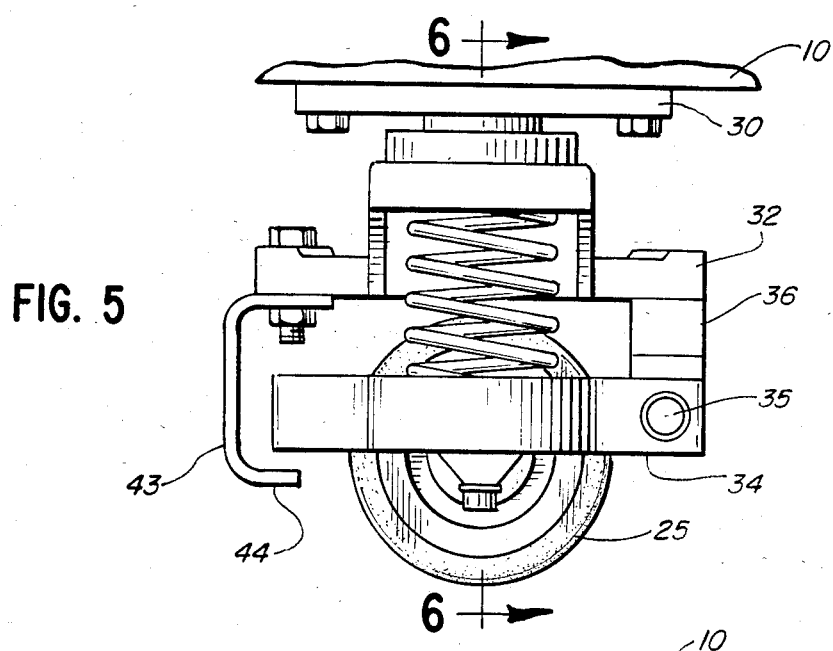
FIG. 5 is a side elevational view of another type of roller assembly and taken along the line 5—5 in FIG. 3.
Figure 6:
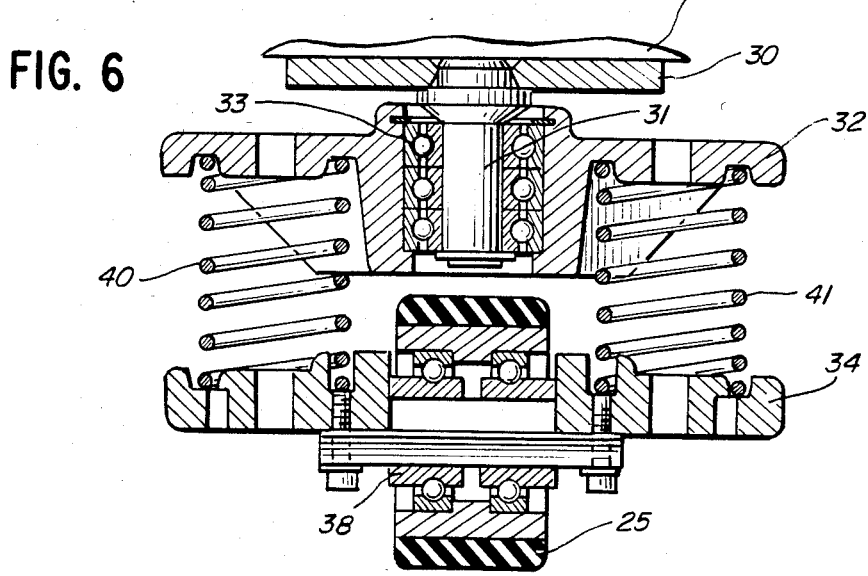
FIG. 6 is a vertical section, taken generally along the line 6—6 in FIG. 5.

The structure and mounting of the drive wheel 25 is shown particularly in FIGS. 5 and 6. A mounting plate 30 is fixed to the underside of the carrier base 10 and mounts a depending pin 31 which rotatably supports an upper plate 32 by bearing means 33. A lower plate 34, shaped similarly to the upper plate 32, is spaced therefrom and pivotally connected thereto by a pivot pin 35 extended between the lower plate and a bracket 36 extending downwardly from the upper plate 32. The lower plate 34 rotatably mounts the drive wheel 26 by bearing means 38.

The upper plate 32 and lower plate 34 are urged apart by means of a pair of springs 40 and 41 having their opposite ends nested in suitably-shaped recesses in the upper plate 32 and lower plate 34, respectively. With this construction and with the carrier C loaded, the springs 40 and 41 function to maintain the plates in the relation as generally shown in FIGS. 5 and 6. The springs permit relative movement between the plates and with the separating movement being limited by a U-shaped bracket 43 secured at one end to the upper plate 32 and having an end 44 extended inwardly to underlie an end of the lower plate 34. At any time that the loading on the drive wheel is removed, the rotative movement of the lower plate 34 under the urging of the springs is limited by the bracket 43.

In the event it becomes necessary to replace one of the springs 40 and 41, this can be accomplished by permitting additional separating movement of the upper and lower plates by removal of the bracket 43.

The drive wheels 25-27 have a number of angularly adjusted positions between a central position in which the drive wheels extend transverse to the rotation axis of the drive tube 15 wherein no motion is imparted to the carrier C, and selective angular positions between two limit positions at opposite sides of the central position. A limit position would generally be with the drive wheel at an angle of 45° to the axis of the drive tube, as shown in FIGS. 2 and 3. The drive wheels can be angularly adjusted approximately 90° in a counterclockwise direction, as viewed in FIG. 3, to be positioned at an opposite limit position at approximately 45° to the axis of the drive tube 15.

The drive wheels are interconnected for simultaneous angular adjustment by means of a connecting link 50 which extends along the underside of the carrier base 10 and is pivotally connected at 51, 52, and 53 to extensions of the upper plates of the drive wheel mountings. The drive wheels are urged to an angular limit position by structure including a spring 55 which surrounds a link 56 pivotally connected at 56a to the plate 29a of the drive wheel 26 and which is movably mounted at its opposite ends in a reverser block 57. The spring 55 acts between a flange 58 on the link 56 and the reverser block 57 to urge the drive wheels in a clockwise direction, as viewed in FIG. 3. This structure is designed for over center operation, whereby the spring 55 will urge the drive wheels to an angular limit position, which is approximately 90° counterclockwise from the position shown in FIG. 3. This shift over center is accomplished by reverser mechanism including the reverser block 57 which is movably guided along a pair of guide rails 60 on the underside of the carrier base.

The reverser block 57 can move between two limit positions, as determined by abutment stops 61 and 62 fixed to the underside of the carrier base 10 and which movably support a reverser rod 63 to which the reverser block 57 is attached. With the parts as positioned in FIG. 3, the abutment stop 62 forms a reaction point to limit movement of the reverser block 57 whereby the spring 55 is effective to urge the drive wheels to a limit position. When the reverser block 57 is against the abutment stop 61, the spring 55 and link 56 extend upwardly and to the right, as viewed in FIG. 3, and the pivot connection 56a is moved to the right from the position shown in FIG. 3.

The reverser block 57 carries a member 58 for engagement in a manner to be described to cause shift of the reverser block 57 along the guide means 60.

The carrier additionally has an accumulation rod 70 extending lengthwise of the carrier base 10 and movably mounted in a pair of abutment stops 71 and 72 fixed to the underside of the carrier base and which function to limit the movement of a deceleration block 73 fixed to the accumulation rod 70 and guided for movement along guide means 74. Deceleration block 73 carries a member 76 engageable by means to be described. Additionally, a stop bar 80 is fixed to the underside of the carrier base. The member 76 is at a distance from the carrier base greater than the stop bar 80 whereby both of the members can coact with the carrier stop to be described.

The accumulation rod is connected to the drive wheels whereby movement of the accumulation rod causes angular adjustment of the drive wheels. This connection includes a link 85 slidable in the deceleration block 73 and having a fixed connection to the plate 29a of the mounting for drive wheel 26.

The accumulation function is diagrammatically illustrated in FIG. 7, with the carriers viewed from the underside for clarity in showing the operative structure.

In FIG. 7, a carrier C-1 is in a stopped position, with the drive wheels 25, 26 and 27 at right angles to the axis of rotation of the drive tube 15. In this position, the accumulation rod 70 is positioned centrally lengthwise of the carrier base 10 and has acted through the deceleration block 73 and the link 85 and against the spring 55 to position the drive wheels in their central non-driving position. This centering of the accumulation rod is achieved at a stop station to be described.

The accumulation function is particularly illustrated in connection with carrier C-2 wherein the accumulation rod 70 of the latter carrier is in abutment with an end of the accumulation rod 70 of the carrier C-1. Before reaching the position shown in FIG. 7, the carrier C-2 has its accumulation rod 70 extending outwardly a greater distance, as shown in FIG. 3, and contacts the adjacent accumulation rod whereby with continuing movement of the carrier C-2 towards carrier C-1, the accumulation rod 70 of carrier C-2 is moved to the position shown to place the drive wheels 25-27 in central position. A carrier C-3 is shown approaching carrier C-2 by the travel arrow and the accumulation rod 70 of carrier C-3 is at full extension. A small amount of additional travel will engage the accumulation rods 70 of carriers C-2 and C-3 and the accumulation rod 70 of carrier C-3 will move to a centered position to move the drive wheels 25-27 of that carrier to central position.

The action in causing a carrier C-1, as shown in FIG. 7, to stop is shown in connection with the structure at a stop station, indicated generally at 100 in FIG. 2. The structure is shown particularly diagrammatically in FIGS. 8 and 9. The stop station 100 includes an acceleration-deceleration cam 101 having a deceleration section 102 and an acceleration section 103.

Figure 9:
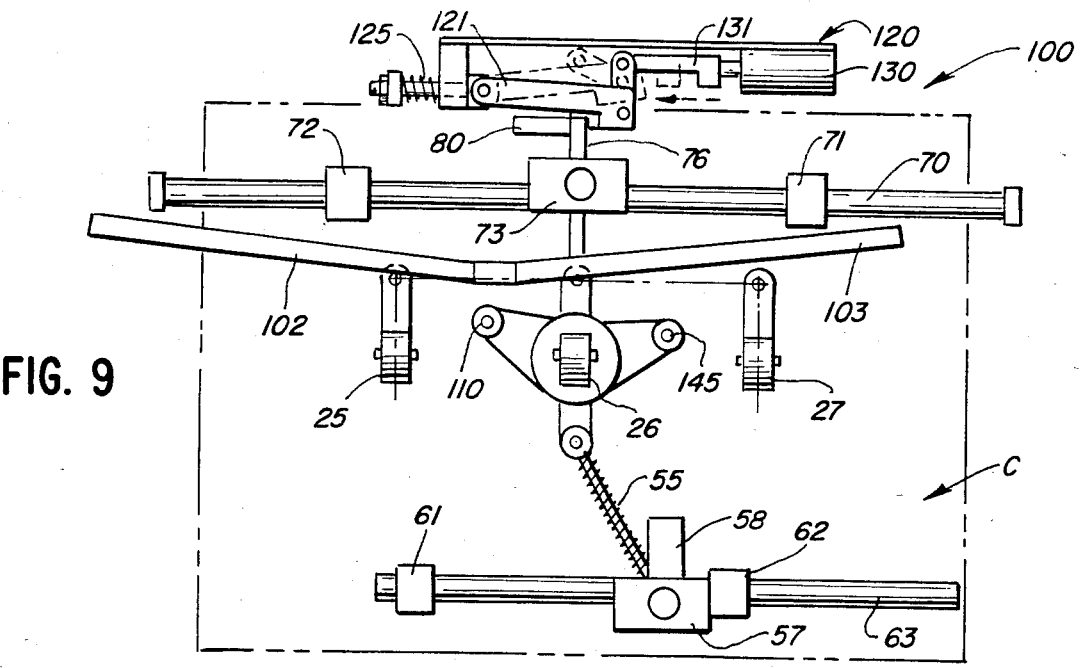
FIG. 9 is a view, similar to FIG. 8, showing the carrier in stopped position at the stop station.

As a carrier C approaches the stop station 100, a cam follower 110 on an arm 111 (FIG. 4) associated with the plate 29a of the drive wheel 26 engages the deceleration cam 102 and causes the drive wheels 25-27 to gradually move from a limit angular position toward the central position against the urging of the spring 55, with the drive wheels ultimately closely approaching the central position as shown in FIG. 8. Further movement of the carrier C toward the right, as indicated by the arrow in FIG. 8, brings the cam follower 110 to an end of the sloped acceleration cam section 102 and brings the member 76 on the deceleration block 73 into engagement with a carrier stop, indicated generally at 120, which is mounted in fixed relation to the tracks. The slight additional forward movement of the carrier C with the member 76 in engagement with the carrier stop brings the drive wheels to the central position, as shown in FIG. 9, and moves the cam follower 110 away from the acceleration-deceleration cam. This final movement also brings the stop bar 80 on the underside of the carrier base into contact with the carrier stop for a controlled stop position.

The carrier stop 120 includes a stop link 121 pivotally mounted at 122 to the end of a movable rod 123 mounted in a bracket 124 secured to a fixed support along the tracks 5 and 6. Stop link 121 has a transverse dimension sufficient to engage both the member 76 and the stop bar 80 and a spring 125 cushions the engagement of the stop bar 80 therewith. The carrier stop can be released by actuation of a motor, such as an air cylinder 130, which moves a member 131 to the left, as viewed in FIG. 8, to move the stop link 121 upwardly to the broken line position, shown in FIG. 9, whereby the member 76 and stop bar 80 are freed from restraint and the spring 55 is immediately effective to rotate the drive wheels 25-27 in a clockwise direction. This movement is without restraint from the acceleration-deceleration cam because of the separation of the cam follower 110 therefrom in the stop position and with the movement of the drive wheels thereafter to their angular limit position being at a controlled rate because of the contact of the cam follower 110 with the acceleration cam section 103.

It will be evident from the foregoing that initiation of carrier movement after stopping is achieved rapidly. The cam follower 110 being at a distance from the acceleration-deceleration cam permits the drive wheels to immediately move to a controlled angle and start the acceleration of the carrier.

Figure 10:
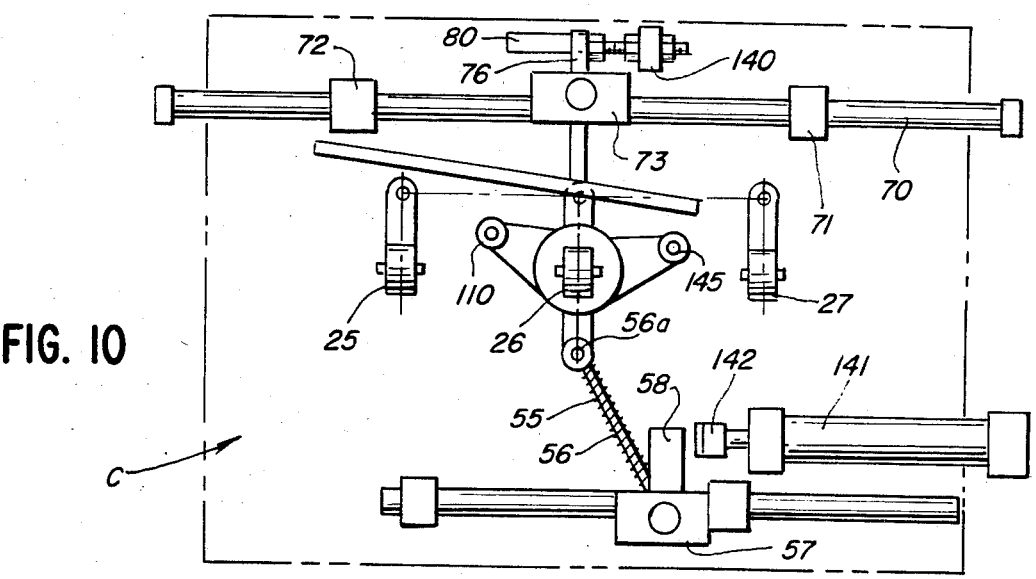
FIG. 10 is a diagrammatic view of a carrier at the end stop position at the end of a path of travel prior to the shift of drive mechanism to cause reverse travel of the carrier.
Figure 11:
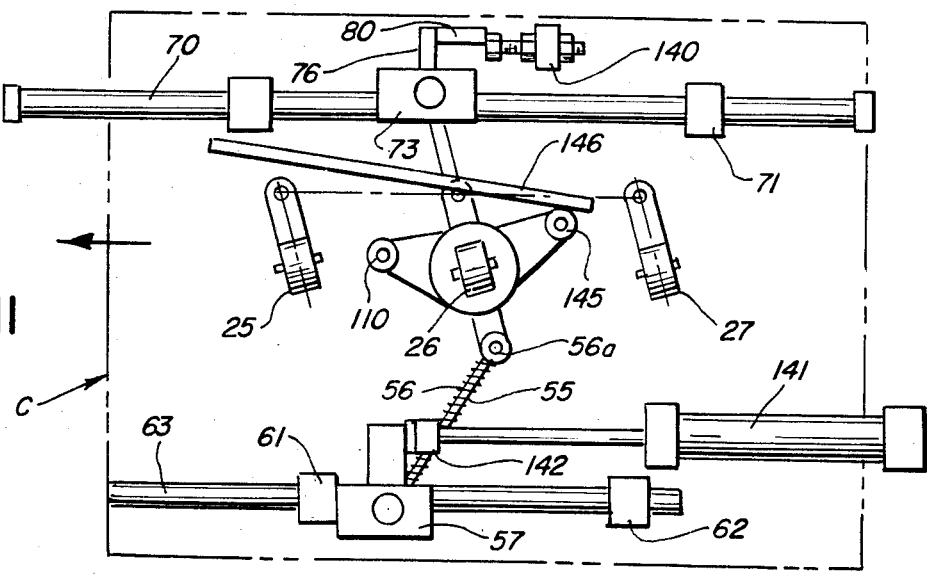
FIG. 11 is a view, similar to FIG. 10, showing the parts associated with the carrier operable for reverse travel.

The carrier construction provides for two-way travel and two-way accumulation, and with this action being achieved in the manner shown diagrammatically in FIGS. 10 and 11. As a carrier C reaches the end of the path of travel along the tracks 5 and 6, the member 76 on the deceleration block 73 comes into contact with a positive stop 140 fixed to the end of the tracks to progressively move the accumulation rod 70 and drive wheels toward central position as described previously in connection with FIGS. 8 and 9 for the action at a stop station. The final movement brings the stop bar 80 into positive contact with the positive stop 140 and, at this time, the parts are positioned as shown in FIG. 10. The action of the drive means is reversed by a suitably controlled motor, such as an air cylinder 141 having an extensible rod carrying an actuator pad 142 which is extended to engage the member 58 of the reverser block 57 and shift the reverser block from the position shown in FIG. 10 to the position shown in FIG. 11. The spring 55 and link 56 are caused to go over center and the drive wheels are shifted from their central position to an opposite angle from that previously described and to the angle as shown in FIG. 11. This action brings a second cam follower roller associated with the mounting for the drive wheel 26 into engagement with an acceleration cam 146 which, as the carrier C moves in the direction of the arrow in FIG. 11, permits the drive wheels 25-27 to gradually increase their angular relation to the drive tube to a maximum limit position to cause the carrier to move toward the left at maximum speed. The reversal action moves the accumulation rod 70 to the left and thus the accumulation rod end extends beyond the leading end of the carrier C as it travels to the left. The accumulation action discussed in connection with FIG. 7 when the carriers are travelling toward the right as viewed in FIG. 7 can also occur when the carriers are travelling toward the left, as viewed in FIG. 11.

With the construction disclosed, it is evident that the carrier system enables improved operation at a stop station and permits accumulation in an improved manner with a carrier travelling in a single direction or with a two-way carrier having travel in two directions along a path and with the two directions of travel being achieved without reversal in the direction of rotation of the drive tube 15.

Figure 12:
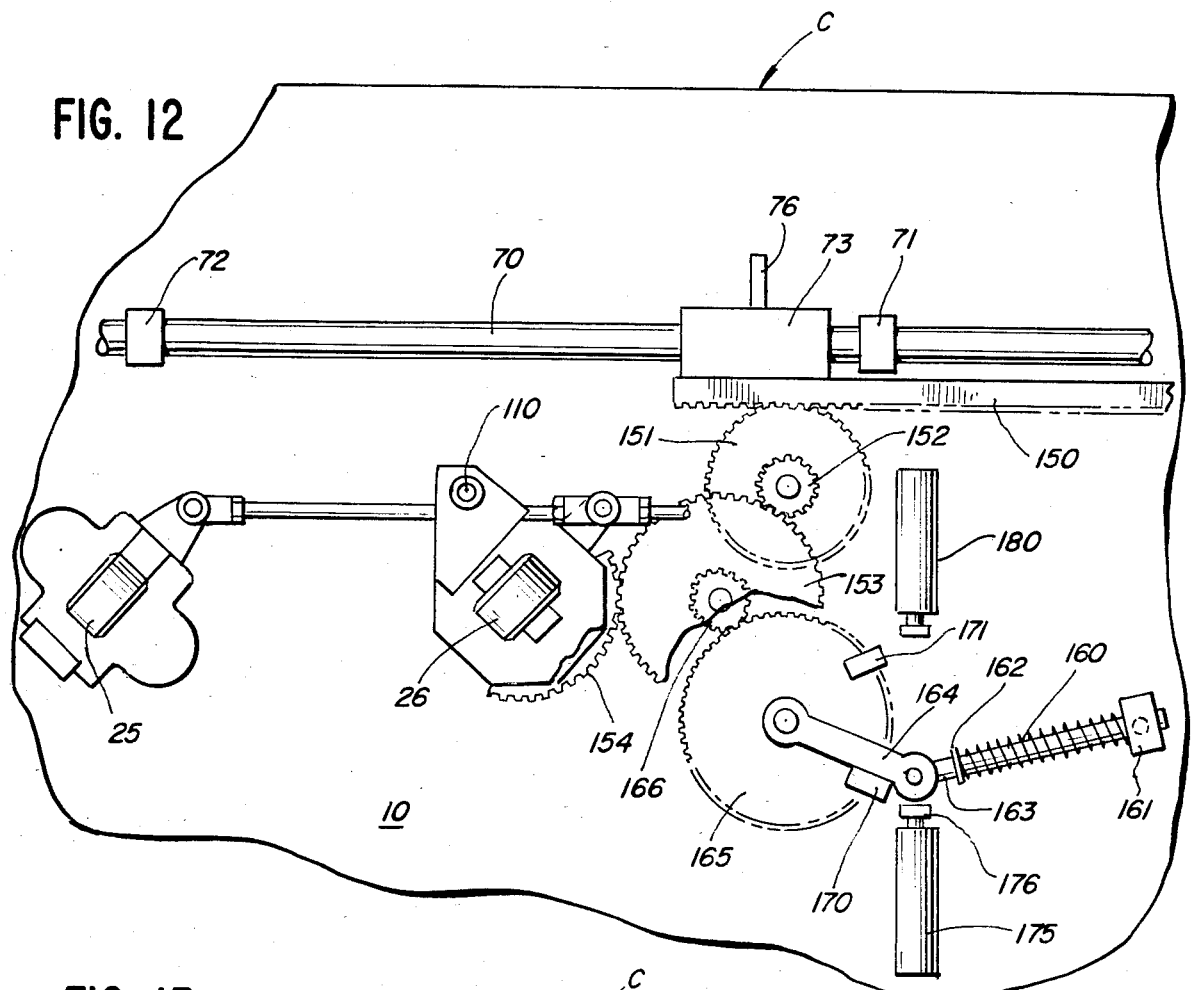
FIG. 12 is a fragmentary schematic view, similar to FIG. 3, of an alternate embodiment of the invention.
Figure 13:
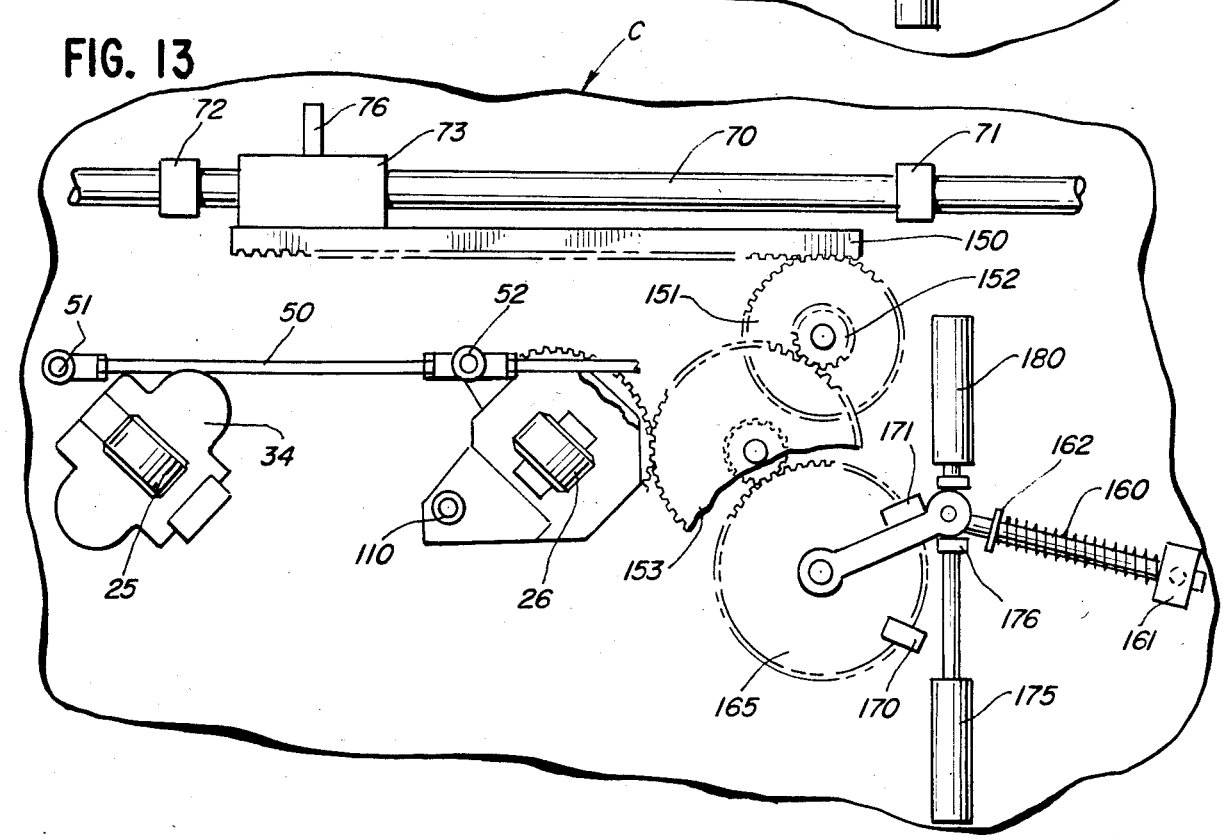
FIG. 13 is a view, similar to FIG. 12, with parts in a different position.

An alternate embodiment of the structure associating the accumulation rod and the reversal mechanism with the drive wheels by gearing is shown in FIGS. 12 and 13. In this embodiment, the accumulation rod 70 has the deceleration block 73 fixed to a rack 150 which meshes with a gear 151 rotatably mounted on the underside of the carrier base 10 and which is rotatably fixed to a gear 152 meshing with a main gear 153 which meshes with a gear 154 associated with the mounting of the drive wheel 26. When the accumulation rod 70 is caused to move lengthwise of the carrier, rotation of the gears causes the same action in changing the angular position of the drive wheels 25-27, as previously described.

The drive wheels are urged to a limit position in a manner generally similar to that previously described wherein a spring 160, acting between a block 161 fixed to the carrier base and a flange 162 on a link fitted within the spring and slidably mounted in the block 161, urges the drive wheels to the limit position. This action is by means of a pivotal connection of the link 163 to an arm 164 rotatably fixed with a gear 165 which meshes with a gear 166 fixed to the main gear 153. The arm 164 is movable between two limit positions between stop members 170 and 171 and the spring-link system can be shifted over center from the position shown by actuation of a motor, such as an air cylinder 175 either fixed to the floor adjacent the path of travel or directly mounted on the carrier base and remotely controlled which, when operated, extends a pad 176 to engage the arm 164 and rotate it counterclockwise into engagement against the stop 171, as shown in FIG. 13. A second motor 180, comparable to the motor 175, can be operated to shift the arm 164 back to the position shown in FIG. 12 for travel in the opposite direction.

We claim:

1. A carrier system having a two-way carrier movable along a path, said carrier being operable to either accumulate or stop at a stop station by control of the angle of a drive wheel on the carrier relative to a rotatable member extending along said path and which imparts rotation to the drive wheel, said stop station having a deceleration-acceleration cam positioned at either side of a stop position for the carrier and a carrier stop, means on the carrier including a cam follower for changing the angle of the drive wheel as the cam follower moves along the cam, means on the carrier including a movable control member operatively connected to the drive wheel and engageable by the carrier stop to move the drive wheel to a stop position generally at a right angle to the rotatable member, and said control member having a normal position with an end extending beyond the carrier whereby said end can be engaged to cause relative movement between the carrier and the control member to move the drive wheel to the stop position for accumulation.

2. A carrier system as defined in claim 1 wherein spring means acts on said drive wheel and said control member to urge the drive wheel angularly away from said stop position and the end of the control member beyond the carrier, and means for reversing the action of the spring means to urge the drive wheel in another angular direction away from the stop position and cause an opposite end of the control member to extend beyond an opposite end of the carrier.

3. A carrier system as defined in claim 2 wherein there is an end stop at an end of the path positioned to engage said control member, and an acceleration cam positioned for engagement by said cam follower when said reversing means operates to control the movement of the drive wheel in the other angular direction.

4. A carrier system having a carrier movable along a path, said carrier being operable to stop at a stop station by control of the angle of a drive wheel on the carrier relative to a rotatable member extending along said path and which imparts rotation to the drive wheel, said stop station having a deceleration-acceleration cam positioned at either side of a stop position for the carrier and a carrier stop, means on the carrier including a cam follower for changing the angle of the drive wheel as the cam follower moves along the cam, means on the carrier including a movable control member operatively connected to the drive wheel and engageable by the carrier stop to move the drive wheel to a stop position generally at a right angle to the rotatable member and to move the cam follower away from the cam.

5. A carrier system as defined in claim 4 wherein said carrier stop is movable to a position out of the path of the movable control member and spring means acting on said drive wheel and said control member urges the drive wheel angularly away from said stop position and the cam follower into engagement with the acceleration portion of the cam.

6. A carrier system as defined in claim 5 wherein said carrier has a positive stop also engageable with the carrier stop, and said movable control member carries a deceleration block which engages the carrier stop before engagement of the carrier stop by the positive stop.

7. A carrier system having a two-way carrier movable along a path, said carrier being operable to accumulate by control of the angle of a drive wheel on the carrier relative to a rotatable member extending along said path and which imparts rotation to the drive wheel, means on the carrier including a movable control member operatively connected to the drive wheel for moving the drive wheel to a stop position generally at a right angle to the rotatable member, said control member having a normal position with an end extending beyond the carrier whereby said end can be engaged to cause relative movement between the carrier and the control member to move the drive wheel to the stop position for accumulation, means acting on said drive wheel and said control member to urge the drive wheel angularly away from said stop position and said end of the control member beyond the carrier, and means for reversing the action of the last-mentioned means to urge the drive wheel in another angular direction away from the stop position and cause an opposite end of the control member to extend beyond an opposite end of the carrier.

8. An on-track carrier system utilizing a carrier movable along track means and powered by a rotatable drive member extending parallel to the track means comprising, means for movably supporting the carrier on the track means, a rotatable drive wheel on the carrier and engageable with the rotatable drive member, means mounting the drive wheel for adjusting movement about an axis extending normal to the rotation axis of the wheel to any position between limit positions at either side of a central position in which the drive wheel rotation axis is parallel with the axis of rotation of the rotatable drive member, and means for adjusting said drive wheel to a predetermined one of said positions including a control member movably mounted on said carrier base for movement lengthwise thereof and having alternate sensing positions in which opposite ends thereof extend beyond opposite ends of said carrier.

9. A carrier system as defined in claim 8 wherein said adjusting means includes a spring urging said drive wheel to one of said limit positions, and means operable to cause said spring to urge said drive wheel to the other limit position.

10. A carrier system as defined in claim 9 including means interconnecting said control member with said drive wheel whereby said control member is urged to one or the other of the sensing positions by said spring.

11. A carrier system as defined in claim 8 wherein there are a plurality of said drive wheels, and means interconnecting said wheels for simultaneous adjusting movement.

12. A carrier system as defined in claim 8 wherein there is a stop station, and means at the stop station for engaging said control member.

13. A carrier system as defined in claim 12 wherein a control cam extends to either side of said stop station, a cam follower on the carrier base engageable with said cam, and means connecting said cam follower and drive wheel whereby movement of the cam follower causes adjusting movement of the drive wheel.

14. A carrier system as defined in claim 13 wherein said cam is contoured to move said drive wheel toward but not to said central position, and said control member is moved at the stop station to move the drive wheel to said central position and the cam follower off the cam.

15. An on-track carrier system as defined in claim 8 including an end stop at an end of the track aligned with the control member for causing movement of the control member to move the drive wheel to said central position, a spring acting in opposition to said movement of the control member, means at the end of the track to reverse the action of the spring, and cam and cam follower means operable to control the effectiveness of said spring after the reversal in the action thereof.

16. A carrier system utilizing a movable carrier comprising, a carrier frame having means for movably supporting the carrier on elongate track means, at least one drive wheel mounted on the frame for engagement with a rotatable drive tube whereby the angle of the drive wheel relative to the drive tube determines the direction and speed of travel of the carrier, an elongate accumulation rod movably mounted on the carrier and extending lengthwise thereof, said accumulation rod having a length to have an end extend beyond the carrier, means interconnecting the accumulation rod and drive wheel whereby the position of the accumulation rod relative to the carrier controls the angle of the drive wheel including a deceleration block fixed to the accumulation rod and a link operatively connected to the drive wheel and slidably associated with the deceleration block, means urging said drive wheel to an angular limit position including a reverser rod movably mounted on the carrier, a link operatively connected to said drive wheel at a distance from a pivot axis for the drive wheel and slidably associated with a block on the reverser rod, and a spring surrounding said link acting to urge said link away from the reverser rod block.

17. A carrier system as defined in claim 16 including a reverser actuator operable to engage and move said reverser rod to shift said link associated with the reverser rod to change the angle of said drive wheel.

18. A carrier system as defined in claim 16 wherein a stop bar is positioned on the carrier to engage a carrier stop at a stop station, and said carrier stop is positioned to engage said deceleration block prior to engagement of said stop bar.

19. A carrier usable in a carrier system wherein the carrier is driven along a path by the angular engagement between a drive wheel on the carrier and a rotatably-driven drive tube extending along the path the improvement comprising, means for stopping the carrier at a stop station along the path or upon the carrier reaching a preceding carrier which is stopped along the path by moving the drive wheel to a non-driving position including an accumulation rod movably mounted on the carrier and operatively connected to the drive wheel, said accumulation rod being positioned for engagement with a preceding carrier which is stopped and having means engageable by a carrier stop at a stop station whereby, in either event, continued movement of the carrier causes relative movement of the accumulation rod to move the drive wheel to said non-driving position.

20. A carrier as defined in claim 19 including means whereby said accumulation rod is operative to move the drive wheel to a non-driving position in both directions of travel of said carrier along said path.

* * * * *